US010526510B2

(12) United States Patent
Kaiser et al.

(10) Patent No.: US 10,526,510 B2
(45) Date of Patent: Jan. 7, 2020

(54) ADHESION PROMOTING COMPOSITION FOR AN ANTI-CORROSION PRODUCT

(71) Applicant: DENSO-HOLDING GMBH & CO., Leverkusen (DE)

(72) Inventors: Thomas Markus Kaiser, Inden (DE); Oleg Gryshchuk, Leverkusen (DE)

(73) Assignee: DENSO-HOLDING GMBH & CO., Leverkusen (DE)

( * ) Notice: Subject to any disclaimer, the term of this patent is extended or adjusted under 35 U.S.C. 154(b) by 0 days.

(21) Appl. No.: 16/093,193

(22) PCT Filed: Apr. 5, 2017

(86) PCT No.: PCT/EP2017/058095
§ 371 (c)(1),
(2) Date: Jan. 23, 2019

(87) PCT Pub. No.: WO2017/178298
PCT Pub. Date: Oct. 19, 2017

(65) Prior Publication Data

US 2019/0249039 A1 Aug. 15, 2019

(30) Foreign Application Priority Data

Apr. 14, 2016 (DE) ........................ 10 2016 106 927

(51) Int. Cl.

| | |
|---|---|
| ***C09J 7/38*** | (2018.01) |
| ***C09J 7/24*** | (2018.01) |
| ***B29C 48/00*** | (2019.01) |
| ***B29C 48/21*** | (2019.01) |
| ***B29C 48/91*** | (2019.01) |
| ***B29C 53/56*** | (2006.01) |
| ***C09J 5/00*** | (2006.01) |
| *B29K 23/00* | (2006.01) |
| *B29K 105/00* | (2006.01) |
| *B29L 7/00* | (2006.01) |

(52) U.S. Cl.
CPC ............. *C09J 7/383* (2018.01); *B29C 48/022* (2019.02); *B29C 48/21* (2019.02); *B29C 48/91* (2019.02); *B29C 53/56* (2013.01); *C09J 5/00* (2013.01); *C09J 7/24* (2018.01); *B29K 2023/06* (2013.01); *B29K 2023/12* (2013.01); *B29K 2105/0097* (2013.01); *B29L 2007/007* (2013.01); *C09J 2205/114* (2013.01); *C09J 2409/00* (2013.01); *C09J 2423/04* (2013.01); *C09J 2423/046* (2013.01); *C09J 2423/101* (2013.01); *C09J 2423/106* (2013.01); *C09J 2423/16* (2013.01)

(58) Field of Classification Search
CPC ........................................................ C09J 7/383
See application file for complete search history.

(56) References Cited

U.S. PATENT DOCUMENTS

| | | | | |
|---|---|---|---|---|
| 3,470,127 A * | 9/1969 | Freeman | C08L 23/16 | 524/526 |
| 3,876,454 A * | 4/1975 | Snell | A61L 15/42 | 428/336 |
| 2010/0214376 A1* | 8/2010 | Nakano | B41J 2/175 | 347/85 |

FOREIGN PATENT DOCUMENTS

| | | | |
|---|---|---|---|
| DE | 2338431 | A1 | 2/1974 |
| DE | 69031709 | T2 | 5/1998 |
| GB | 1414059 | A | 11/1975 |
| GB | 2011430 | A | 7/1979 |
| GB | 2179359 | A | 3/1987 |

* cited by examiner

*Primary Examiner* — Daniel H Lee
(74) *Attorney, Agent, or Firm* — Dinsmore & Shohl LLP

(57) ABSTRACT

An adhesion promoting composition for an anti-corrosion includes about 20% by weight to about 70% by weight of at least one polyolefin selected from polyethylene and/or polypropylene; about 20% by weight to about 65% by weight of at least one butyl rubber; and about 6% by weight to about 35% by weight of at least one elastomer selected from a group comprising ethylene-propylene-rubber and/or ethylene-propylene-diene rubber; each based on the total quantity of the adhesion promoting composition.

17 Claims, No Drawings

ADHESION PROMOTING COMPOSITION FOR AN ANTI-CORROSION PRODUCT

CROSS-REFERENCE TO RELATED APPLICATIONS

This application is the U.S. national stage of PCT/EP2017/058095 filed Apr. 5, 2017, which claims priority of German Patent Application No. DE 102016106927.2, filed Apr. 14, 2016.

FIELD OF THE INVENTION

The present disclosure relates to an adhesion promoting composition for an anti-corrosion product, in particular an anti-corrosion product comprising an anti-corrosion composition, comprising at least one butyl rubber, a carrier having an adhesion promoting composition according to the disclosure as well as methods and uses thereof.

BACKGROUND OF THE INVENTION

Anti-corrosion products, particularly in tape format, for example for pipe systems such as pipelines, but also for technical plants etc. are widely known from the prior art. EP 0 421 607 A1 discloses a tape wrap system for protecting tubular articles comprising an inner wrap covering the surface of the article to be protected and an outer wrap placed over said inner wrap. Said inner wrap comprises an impact-resistant layer carrying an adhesive layer on its inner surface and a layer on its outer surface. Said outer wrap comprises a carrying layer. Said inner wrap and outer wrap including a heat-fusible material, and said tape wrap system is applied to the tubular article in a way that said outer wrap heat fuses together with said inner wrap when heated and thereafter cooled, thus forming a completely closed protective coating. As heat-fusible material for example ethylene vinyl acetate, ethylene methyl acrylate and polyethylene of low density are used. The problem of the tape wrap system disclosed in EP 0 421 607 A1 is that at higher temperatures it might loosen from the wrapped article, as for example a pipeline and/or the article's mechanical properties might deteriorate. This is in particular due to the depolymerization of the used materials, be it the heat-fusible materials or the carrier layer. Although an improved bonding can also be achieved by using solvent-based primers or adhesion promoters, this often does not suffice, and moreover, these primers and agents do not have any effect on the mechanical properties of the wrapping itself.

SUMMARY OF THE INVENTION

The object of the present disclosure is therefore to provide an adhesion promoting composition for an anti-corrosion product which avoids the problems known from the prior art.

This object is achieved by providing an adhesion promoting composition for an anti-corrosion product, preferably an anti-corrosion product in tape format, comprising at least one butyl rubber, wherein the adhesion promoting composition comprises about 20% by weight to about 70% by weight of at least one polyolefin selected from a group comprising polyethylene and/or polypropylene; about 20% by weight to about 65% by weight of at least one butyl rubber; and about 6% by weight to about 35% by weight of at least one elastomer selected from a group comprising ethylene-propylene-rubber and/or ethylene-propylene-diene rubber; while the weight percent quantities (specified in weight percent, abbreviated % by weight or weight-%) are each based on the total quantity of the adhesion promoting composition.

DETAILED DESCRIPTION OF THE PREFERRED EMBODIMENTS

Said at least one polyolefin is preferably comprised in the adhesion promoting composition in a quantity ranging from about 30% by weight to about 60% by weight, further preferred in a quantity ranging from about 32% by weight to about 55% by weight, each based on the total quantity of the adhesion promoting composition. As far as a polyethylene is selected as polyolefin, this is preferably selected from a group comprising high-density polyethylene (HDPE), medium-density polyethylene (MDPE), low-density polyethylene (LDPE), linear low-density polyethylene (LLDPE), high-molecular polyethylene (PE-HMW) and/or ultrahigh-molecular polyethylene (PE-UHMW), wherein especially preferred, at least one MDPE and/or at least one HDPE are used. An MDPE preferably has a density between about 0.926 g/cm$^3$ and about 0.939 g/cm$^3$, a HDPE between about 0.94 g/cm and 0.97 g/cm, each measured according to ISO 1183 in the version valid at the time of the present disclosure.

As far as a polypropylene is selected as polyolefin, this is preferably selected from a group comprising isotactic polypropylene (iPP), syndiotactic polypropylene (sPP) and/or atactic polypropylene (aPP), wherein preferably, an isotactic polypropylene is selected. Said isotactic polypropylene is preferably selected from a group comprising homopolymers, block-copolymers and/or random-copolymers. As copolymer, preferably ethene is used.

Especially preferred, the adhesion promoting composition according to the disclosure comprises exactly one polyolefin or exactly one polypropylene.

Preferably, said at least one polyolefin is electron-beam cross-linkable. Especially preferred in this case, said polyolefin is an electron-beam cross-linkable polyethylene of medium density or higher density, or even a polypropylene, preferably an isotactic polypropylene, wherein, if using polypropylene, this is for the sake of a successful electron-beam crosslinking preferably used as a master batch with at least one crosslinking accelerant and appropriate copolymers where applicable. An electron-beam crosslinking of said electron-beam cross-linkable polyolefins in particular improves their temperature resistivity, but also their mechanical strength. As far as a polyethylene is used as at least one polyolefin, this advantageously has a density of at least 800 kg/m$^3$, measured according to ISO 1872-2/ISO 1183 in the version applicable at the time of the patent application, and is preferably in a range from about 850 kg/m$^3$ to about 1,000 kg/m$^3$, further preferred in a range from about 900 kg/m$^3$ to about 980 kg/m$^3$. As far as a polypropylene is used as at least one polyolefin, this advantageously has a density of preferably at least 800 kg/m$^3$, measured according to ISO 1872-2/ISO 1183 in the version applicable at the time of the patent application, and is preferably in a range from about 850 kg/m$^3$ to about 980 kg/m$^3$, further preferred in a range from about 890 kg/m$^3$ to 960 kg/m$^3$.

An electron-beam crosslinking of the adhesion promoting composition according to the disclosure is advantageously performed with β-rays, however, can also be performed with γ-rays. Preferably, a radiation will be performed in a dose ranging from about 25 kGy to about 250 kGy.

Said at least one polyolefin, especially polyethylene or polypropylene must however not be electron-beam crosslinkable, if different, alternative methods of crosslinking or bonding are applied, as for example heat treatment. By means of heat treatment it is also possible to crosslink or to bond the adhesion promoting composition according to the disclosure, for example using a carrier and/or an anticorrosion composition. Said heat treatment is carried out at a temperature at which the viscosity of the components of the adhesion promoting composition is reduced, in particular of said at least one butyl rubber and of said at least one elastomer, preferred at about 150° C. to about 200° C., further preferred at about 160° C. to about 180° C.

Preferably, said at least one butyl rubber is selected from a group comprising at least partly crosslinked and/or un-crosslinked butyl rubbers. Especially preferred, the adhesion promoting composition according to the disclosure comprises exactly one butyl rubber, preferably an at least partly crosslinked butyl rubber. In an alternative embodiment, the adhesion promoting composition according to the disclosure preferably comprises exactly one crosslinked butyl rubber and exactly one un-crosslinked butyl rubber. Preferably, the adhesion promoting composition comprises at least one butyl rubber in a quantity of at least about 23% by weight to about 60% by weight, further preferred in a quantity ranging from about 25% by weight to about 53% by weight, each based on the total quantity of the adhesion promoting composition. As far as a mixture of a crosslinked butyl rubber with an un-crosslinked butyl rubber is provided, said crosslinked butyl rubber is present in a quantity ranging from about 5% by weight to about 95% by weight, and said un-crosslinked butyl rubber is present in a quantity ranging from about 95% by weight to about 5% by weight in such a mixture. Preferably, such a mixture of exactly one crosslinked butyl rubber and one un-crosslinked butyl rubber comprises said crosslinked butyl rubber in a quantity ranging from about 45% by weight to about 95% by weight and said un-crosslinked butyl rubber in a quantity ranging from about 5% by weight to about 55% by weight. Further preferred, the relation between said un-crosslinked butyl rubber and said crosslinked butyl rubber in such a mixture is in a range from about 1.1:1 to about 4:1.

As far as an at least partly crosslinked butyl rubber is used as at least one butyl rubber, it preferably has a Mooney viscosity ML (1+3) at 127° C. in a range of about 50 MU to about 98 MU. The Mooney viscosity is measured according to ISO 289 in the version 2005 or according to ASTM 1604-04. Preferably, the Mooney viscosity ML (1+3) is at 127° C. in a range of about 60 MU to about 90 Mu, further preferred in a range of about 65 MU to about 93 MU, even further preferred in a range of about 78 MU to about 92 MU and even further preferred in a range of about 78 MU to about 90 MU. The specific density of said at least partly crosslinked, further preferred highly crosslinked butyl rubber is at a temperature of 25° C. according to ASTM D1875 in the version of 2003 in a range of about 0.5 to about 1.1, preferred in a range of about 0.9 to about 0.98. Said at least one crosslinked butyl rubber is preferably selected from a group comprising crosslinked butyl rubbers including halobutyl rubbers. As far as the term "crosslinked" is used with reference to butyl rubber, this is meant to refer to the starting material and not to the final adhesion promoting composition, which can in particular also be subject to electron-beam crosslinking. Consequently, said used at least one crosslinked butyl rubber can also be referred to as pre-crosslinked butyl rubber in the sense of the present disclosure.

As far as an un-crosslinked butyl rubber is used as at least one butyl rubber, it preferably has an average molecular weight in a range from about 150.00 to about 2,000,000. It preferably has a Mooney viscosity ML (1+8) at 125° C. in a range of about 20 MU to about 65 MU. Preferably, said at least one un-crosslinked butyl rubber has an average molecular weight $M_w$ (also referred to as molecular mass $M_w$) in a range from about 300,000 to about 1,800,000, further preferred in a range from about 200.000 to about 500,000. Preferably, said at least one un-crosslinked butyl rubber has a Mooney viscosity ML (1+8) at 125° C. in a range of about 25 MU to about 65 MU, preferred from about 30 MU to about 60 MU, even further preferred from about 40 MU to about 59 MU, and even further preferred from about 40 MU to about 55 MU, measured according to ISO 289 in the version of 2005 or according to ASTM 1604-04.

The term butyl rubber in the sense of the present disclosure is referred to especially as co or block-copolymers of isobutylene with about 0.5% by weight to about 5.0% by weight of isoprene, based on the total quantity of said butyl rubber. These are preferably produced by cationic polymerization. In the sense of the present disclosure, the term butyl rubber in particular also comprises halogenated butyl rubbers, particularly such being chlorinated or brominated (chlorobutyl rubber or bromobutyl rubber). Mixtures of various butyl rubbers may also be used, i.e. more than at least one butyl rubber.

Said at least one butyl rubber of the adhesion promoting composition according to the disclosure has values for the unsaturation in a range from about 1% by mole to about 3% by mole, further preferred in a range from about 1.3% by mole to about 2.5% by mole. This means that preferably about 1% by mole to about 3% by mole, further preferred about 1.3% by mole to about 2.5% by mole of unsaturated bonds. i.e. carbon-carbon-double bonds are present as functional groups in said at least one butyl rubber. Especially preferred, said at least one butyl rubber is produced by co-polymerization of isobutylene and isoprene in methyl chloride as a solvent.

Preferably, said at least one elastomer is an ethylene-propylene-diene rubber, preferred in a quantity ranging from about 18 to about 30% by weight, especially preferred ranging from about 15 to about 28% by weight (% by weight each time based on the total quantity of the adhesion promoting composition), the diene being a 5-ethylidene-2-norbornes in a quantity ranging from about 0.8% by weight to about 8% by weight, preferred in a quantity ranging from about 1% by weight to about 7.5% by weight, even further preferred in a quantity ranging from about 1.4% by weight to about 7% by weight, based on the total quantity of the monomers being used in a polymerization to said ethylene-propylene-diene rubber.

The term ethylene-propylene-diene rubber, which may be comprised by the adhesion promoting composition according to the disclosure as at least one elastomer, defines in particular such co or block-copolymers as well as terpolymers which have a carbon-carbon-double bond as functional groups. Even mixtures of various elastomers may be used. Especially preferred in this case are terpolymers resulting from a polymerization reaction with ethylene, propylene and a diene. These are also referred to as EPDM terpolymers and combine a saturated polymer backbone with unsaturated remainders in side groups. Especially preferred in the sense of the present disclosure, 5-ethylidene-2-norbornes, dicylopentadiene and/or 5-vinylidene-2-norbornes are used in this case as diene, namely in quantities of up to about 15% by weight, preferred in quantities ranging from about 0.3% by weight to about 12% by weight. In case of using 5-ethylidene-2-norbornes, preferably quantities in a range from about 0.5% by weight to about 11% by weight, and in case of using dicylopentadien, quantities in a range from about 1% by weight to about 6% by weight are used. The before-mentioned weight percent quantities (specified in weight percent, abbreviated % by weight or weight-%) are in this case based on the total quantity of the monomers being used in a polymerization to an EPDM or ethylene-propylene rubber.

The adhesion promoting composition according to the disclosure can furthermore comprise at least one additive, selected from a group comprising tackifiers, antioxidants, catalysts, co-reagents and/or pigments. Especially preferred are pigments, in particular color pigments. These can also for example be used in a master batch with said at least one polyolefin. If said at least one polyolefin is used in the form of a master batch, it preferably comprises at least 92% by weight of said polyolefin, based on the total quantity of the master batch, further preferred at least 94% by weight of said at least one polyolefin. A pigment as for example carbon black is preferably comprised by such a master batch of said at least one polyolefin in a quantity ranging from about 0.5% by weight to about 8% by weight, further preferred in a quantity from about 1% by weight to about 6% by weight.

As tackifiers, hydrocarbon resins may be used, preferably in a range from about 0.5% by weight to about 10% by weight, further preferred in a range from about 1% by weight to about 5% by weight, each based on the total quantity of the adhesion promoting composition according to the disclosure. Where appropriate, at least one oxidant can be added to the adhesion promoting composition according to the disclosure. Preferably, a mixture of various oxidants is provided. Said at least one oxidant is present in a quantity ranging from about 0.1% by weight to about 1% by weight, further preferred in a quantity ranging from about 0.2% by weight to about 0.5% by weight, each based on the total quantity of the adhesion promoting composition according to the disclosure. As catalysts, preferably organic bonds with zinc or tin, as for example zinc stearates or zinc oleates, are used solely or in mixtures. Said catalysts, solely or in mixtures, are preferably comprised in a quantity ranging from about 0.001% by weight to about 10% by weight, preferred ranging from about 0.005% by weight to about 4% by weight, each based on the total quantity of the adhesion promoting layer.

Further preferred, the adhesion promoting composition according to the disclosure can comprise at least one co-reagent for said catalyzing agent, selected from a group comprising triallyl cyanurate, triallyl isocyanurate, triallyl phosphate and/or divinyl benzene, and especially preferred a triallyl cyanurate and/or a triallyl isocyanurate. Said co-reagent in particular serves to render said used catalytic agent of the composition compatible. The adhesion promoting composition advantageously comprises the co-reagent in a quantity ranging from about 0.01% by weight to about 5% by weight, further preferred in a quantity ranging from about 0.2% by weight to about 5% by weight, preferred to about 3% by weight, based on the total quantity of the adhesion promoting composition. Especially preferred, such co-reagent is used which is selected from a group comprising triallyl cyanurate, triallyl isocyanurate and/or triallyl phosphate, especially preferred, at least one triallyl cyanurate, wherein said afore-mentioned co-reagents can be comprised in the composition in a quantity ranging from about 0.02% by weight to about 2% by weight, preferred in a quantity ranging from about 0.025% by weight to about 0.3% by weight, each based on the total quantity of the adhesion promoting composition.

Especially preferred, adhesion promoting compositions each comprise exactly one polyolefin, exactly one butyl rubber and exactly one elastomer. Especially preferred in this case, a polyethylene or a polypropylene as exactly one polyolefin is used, preferably, each of them is electron-beam cross-linkable. As exactly one butyl rubber, preferably, a crosslinked, which may also be a pre-crosslinked, butyl rubber can be used. As exactly one elastomer, preferably, an ethylene-propylene-diene rubber, especially preferred such having 5-ethylidene-2-norbornes as diene, is used. An especially preferred adhesion promoting composition according to the disclosure comprises about 22% by weight to about 55% by weight of a crosslinked butyl rubber, about 28% by weight to about 53% by weight of at least one electron-beam cross-linkable polyethylene or polypropylene and about 12% by weight to about 30% by weight of an ethylene-propylene-diene rubber with 5-ethylidene-2-norbornes as diene in a quantity of about 1.5% by weight to about 5% by weight, based on said monomers being used in a polymerization to said ethylene-propylene-diene rubber. The aforementioned weight percentages apart from said diene are based on the total quantity of the adhesion promoting composition according to the disclosure.

The advantage of the adhesion promoting composition according to the disclosure is that it can be effective at higher temperatures and moreover, also provides sufficient mechanical strength. It is in particular appropriate for the use in anti-corrosion tapes and especially in such having at least one carrier, particularly in the form of a carrier film, and at least one layer of an anti-corrosion composition, wherein the latter preferably comprises at least one butyl rubber. The adhesion promoting composition according to the disclosure is especially useful as adhesive layer between a carrier film and an anti-corrosion composition. The adhesion promoting composition has good resistances to peeling, which according to DIN EN 12068 in the version of 1999-03 can be measured, namely not only at higher temperatures of 80° C. or more, but even at room temperature. i.e. 20° C. or 23° C. The peeling resistance of an anti-corrosion tape comprising an adhesion promoting layer according to the disclosure with the same carrier in the form of a carrier film and identical anti-corrosion composition, is about three to about five times higher than a peeling resistance of an adhesion promoting composition which comprises for example only at least one polyolefin and at least one butyl rubber, wherein said polyolefin and said butyl rubber are selected identically to the anti-corrosion tape comprising the adhesion promoting composition according to the disclosure. The aforementioned peeling resistance refers to the mechanical peeling test according to DIN EN 12068 in the version 1999-03, namely based on either applying an anti-corrosion tape comprising the adhesion promoting layer according to the disclosure onto a factory coating of for example a pipe like a gas pipe or pipeline, or based on applying it onto the outer surface of a non-coated pipe as for example a steel pipe.

The substantially improved peeling resistances provide a very good mechanical strength, which can be achieved with the adhesion promoting composition. This also applies at higher temperatures, in particular at temperatures of 80° C. and more. Moreover, the adhesion promoting composition provides an excellent bonding to a carrier, especially in the form of a carrier film, but also in the form of an overstretch prevention layer, and to an anti-corrosion composition, particularly such comprising at least one butyl rubber. Further advantageous is that due to the specific composition of the adhesion promoting composition according to the disclosure, particularly in case of applying it on a carrier, it can be produced together with said carrier by means of a laminating process or a co-extrusion process, preferably a co-extrusion process and subsequently be subject to electron-beam crosslinking together with said carrier. A disadvantageous depolymerization of said butyl rubber due to electron-beam crosslinking is offset by using the specific weight percentages and adding at least one elastomer. After all, in this way, carriers comprising the adhesion promoting layer can be obtained which provide an improved thermal and mechanical strength.

Due to these improved properties, anti-corrosion tapes comprising the adhesion promoting layer according to the different embodiments of the disclosure, in particular regarding the strength of the used carrier and/or the used at least one anti-corrosion composition, can for example be applied to gas pipe or pipelines, without the necessity of bedding the pipeline in sand after having applied a corrosion protection via the anti-corrosion tape, while the sand has in addition to be supplied from offsite. Instead, the digging from the construction site can for example be used, if appropriate after crushing by suitable crushers for preparing certain soil qualities, for the bedding of for example a gas pipe or pipeline. This can save considerable costs, whether regarding the transport and storage of the sand, or regarding reduced environmental damage by less movements of heavy equipment. After all, using the adhesion promoting composition according to the disclosure enables to achieve a resistant anti-corrosion system particularly in the form of a tape-shaped anti-corrosion product. By means of the adhesion promoting composition according to the disclosure, a durable anti-corrosion system can be obtained also in the form of a pad-shaped anti-corrosion product. This durable anti-corrosion system according to the disclosure has preferably the form of an anti-corrosion tape or an anti-corrosion pad, especially preferred is an anti-corrosion tape.

Furthermore, the present disclosure relates to a carrier with at least one adhesion promoting composition according to the disclosure, applied on one side of said carrier, as outlined above. Especially preferred, said carrier is formed like a tape, but may also have a pad shape or in any other flat form. Further preferred, said carrier is provided with an adhesion promoting composition according to the disclosure on both sides of it. In case of applying it on both sides of said carrier, the applied adhesion promoting composition can be identical, but also different. Preferably, the adhesion promoting composition is applied on the complete surface of at least one side of said carrier. Said carrier can in particular be formed as a carrier film, a shrinking tape or tube or as an overstretch prevention layer. If formed as a carrier film or overstretch prevention layer, which is also shaped as a film and preferably as a tape, it differs in particular as to its thickness. As far as said carrier is formed as a carrier film, it preferably has a thickness in a range of about 0.2 mm to about 1.2 mm, further preferred a thickness in a range of about 0.3 mm to about 1.0 mm. As far as said carrier is formed as an overstretch prevention layer, it preferably has a thickness in a range of about 15 μm to about 100 μm, further preferred in a range of about 20 μm to about 75 μm. The function of an overstretch prevention layer is to prevent for example a tape-shaped anti-corrosion product from overstretching, particularly in case of a spiral wrapping of it around a pipe to be covered, for example a pipeline.

Preferably, said carrier comprises a carrier material selected from a group comprising polyethylene and/or polypropylene. Preferably, the carrier material is either a polyethylene or a polypropylene. Said at least one polyethylene and/or polypropylene can in this case be used in the form of a master batch and can in particular comprise an admixture with pigments. As pigments, for example carbon black or color pigments can be added in a quantity ranging from about 0.5% by weight to about 6% by weight, further preferred in a quantity ranging from about 1% by weight to about 4% by weight, based on the total quantity of the carrier material. As far as said carrier is formed as an overstretch prevention layer, it is preferably made of a polyethylene of low or very low density, hence from an LDPE or LLDPE. In a tape-shaped anti-corrosion product, preferably, an overstretch prevention layer comprising the adhesion promoting composition according to disclosure in the form of an adhesion promoting layer preferably on both sides of it, is arranged symmetrically more or less in the middle in a, particularly tape-shaped, anti-corrosion product, however, may also be arranged in the product asymmetrically displaced towards the top or bottom of it. Especially preferred is a symmetrical arrangement more or less in the middle, i.e. at half of the thickness of a tape-shaped anti-corrosion product. As far as said carrier is formed as an overstretch prevention layer and an LDPE or LLDPE is used as material for said carrier, an appropriate polyethylene is comprised by the adhesion promoting composition according to the present disclosure, i.e. an LDPE or LLDPE, wherein the polyethylenes in the carrier material or in the adhesion promoting composition may not be identical, which is however preferred. Preferably, said polyethylene and/or polypropylene used as carrier material in case of arranging said carrier as an overstretch prevention layer, is electron-beam crosslinkable.

As far as said carrier is arranged as a carrier film, it is preferably formed of exactly one polyethylene or exactly one polypropylene, wherein said polyethylene or polypropylene preferably is electron-beam cross-linkable. Even in case of providing it as carrier film, said polyethylene or polypropylene can be used as a master batch, wherein further additives and in particular also pigments as for example carbon black or color pigments can be present, namely preferably in a quantity ranging from about 0.5% by weight to about 6% by weight, further preferred in a quantity ranging from about 1% by weight to about 5% by weight, each based on the total quantity of the carrier material used. Preferably, in case of arranging said carrier as a carrier film, a medium-density polyethylene (MDPE) or a polyethylene of a higher density (HDPE) is used as a polyethylene, preferably a such being electron-beam cross-linkable. The corresponding adhesion promoting layer, which may be arranged on one or both sides of said carrier film, is preferably produced of an adhesion promoting composition according to the disclosure with at least one MDPE and/or at least one HDPE, preferably electron-beam cross-linkable. As far as a polypropylene is provided as carrier material in a carrier, arranged as a carrier film, preferably, an isotactic polypropylene is used, which may for the purpose of electron-beam cross-linkability in addition comprise copolymers and/or crosslinking accelerators. If said carrier is arranged as a carrier film made of a polypropylene, the adhesion promoting layer can be composed of an adhesion promoting composition according to the disclosure, which comprises a polyethylene or a polypropylene as at least one polyolefin. This means that different polyolefins can be present in said carrier and in the adhesion promoting layer. Regarding said polyethylenes and polypropylenes used in the adhesion promoting layer it may be referred to their properties as above described with respect to the adhesion promoting composition.

Preferably, upon forming said carrier, may be as an overstretch prevention layer or as a carrier film, it is subject to a slight stretching, in a way that advantageously, it tends to shrink when heated and thus a possible elongation when heated can be overcompensated. Especially preferred, said carrier film together with the adhesion promoting layer made of the adhesion promoting composition according the disclosure, applied on one or both sides of it, are subject to a slight stretching. If applied by wrapping it around tube-like articles as for example pipelines, the stretching can increase the pressing force directed to the tube-like article.

As far as said carrier, whether formed as a carrier film or as an overstretch prevention layer, provides an adhesion promoting layer made of the adhesion promoting composition on one or both sides of it, the adhesion promoting layer has a thickness in a range from about 10 μm to 150 μm, further preferred a thickness in a range from about 20 μm to about 100 μm, even further preferred a thickness in a range from about 25 μm to about 80 μm. As far as said carrier is formed as an overstretch prevention layer, an adhesion promoting layer is provided on one or both sides of it, having a thickness which approximately corresponds to the thickness of the overstretch prevention layer, or it has a lower thickness.

Said carrier being provided with an adhesion promoting composition on at least one side of it, is advantageously produced with the adhesion promoting composition in co-extrusion. In this case upon carrying out the co-extrusion process, on one or even on both sides of said carrier, an adhesion promoting layer made of the adhesion promoting composition according to the disclosure can be applied. Alternatively to said co-extrusion, a lamination process could be applied, however, a co-extrusion process is preferred, as in this case no delamination effects between the carrier material of said carrier and the material of the adhesion promoting layer, especially at lower temperatures, can occur.

As above already mentioned, said carrier material, but also the at least one polyolefin comprised by the adhesion promoting layer, is preferably electron-beam cross-linkable. An electron-beam crosslinking is preferably carried out subsequently or during or directly after co-extrusion or lamination. If the adhesion promoting composition forming the adhesion promoting layers also comprises an electron-beam cross-linkable polyolefin, this is electron-beam cross-linked together with the carrier material. In this way, temperature-resistant and mechanically stable, co-extruded or laminated carrier arrangements comprising adhesion promoting layers made of the adhesion promoting compositions according to the disclosure being arranged on one or both sides of them, are received. Even if it is actually disadvantageous to provide butyl rubber in an electron-beam cross-linking, however, in the adhesion promoting composition according to the disclosure, a mechanically sufficiently solid, preferably co-extruded or laminated product in the form of a carrier comprising an adhesion promoting layer arranged on one or both sides of it, is received by the selected weight percentages and the selected ingredients, especially the at least one elastomer, while a de-polymerization of said butyl rubber during electron-beam crosslinking does not show any adverse effects.

Preferably, said carrier is formed as a carrier film, wherein a medium-density polyethylene (MDPE), preferably an electron-beam cross-linkable is provided as carrier material. If an MDPE is used as carrier material for said carrier film, the adhesion promoting layer preferably provides a medium-density polyethylene or even a polyethylene of a higher density (HDPE), further preferred at least one HDPE, even further preferred exactly one HDPE. Said at least one polyethylene in the adhesion promoting layer is in these cases present in it in a quantity ranging from about 25% by weight to about 40% by weight, based on the total quantity of the adhesion promoting layer.

As far as said carrier is arranged as a carrier film and at least one polypropylene, preferably an isotactic polypropylene is used as carrier material, the at least one polypropylene in the adhesion promoting layer is comprised by the adhesion promoting composition according to the disclosure in a quantity ranging from about 20% by weight to about 55% by weight, further preferred in a quantity ranging from about 25% by weight to about 40% by weight, while the weight percentages are based on the total quantity of the adhesion promoting composition.

A carrier, may be arranged as an overstretch prevention layer or as a carrier film, comprising an adhesion promoting layer made of the adhesion promoting composition according to the disclosure, which is applied on at least one side or on both sides of it, is an intermediate product, which can be further processed to for example a tape-shaped anti-corrosion product. The adhesion promoting layer comprises the adhesion promoting composition according to the present disclosure, if appropriate, in electron-beam crosslinked form. Said intermediate product can thus be referred to as two- or three-layered.

The present disclosure furthermore relates to an anti-corrosion product, in particular in the form of a tape or pad or of any other flat form, comprising a carrier with at least one adhesion promoting composition in the form of an adhesion promoting layer as above described and at least one anti-corrosion layer made of an anti-corrosion composition which is applied onto the adhesion promoting layer made of the adhesion promoting composition. Said anti-corrosion composition comprises at least one butyl rubber and/or at least one polyisobutylene. Said at least one butyl rubber of the anti-corrosion composition can in this case comply with said un-crosslinked or said at least partly pre-crosslinked butyl rubber, which is disclosed above in connection with the adhesion promoting layer according to the disclosure. In this respect it may be referred to the properties and physical-chemical parameters of the butyl rubber as indicated above. Preferably, said at least one butyl rubber of the anti-corrosion composition is an un-cross-linked butyl rubber, as described further above. This can in parts be replaced by a preferred depolymerized further butyl rubber, in particular such having an apparent viscosity according to Brookfield according to DIN EN ISO 2555 in the version 2000-01 at 66° C. ranging from about 400,000 mPa·s to about 2,000,000 mPa·s, preferred from about 600,000 mPa·s to about 1,600,000 mPa·s. The polymerized further butyl rubber preferably has an average molecular weight $M_w$ (also referred to as average molar mass or molecular mass $M_w$) ranging from about 20,000 to about 60,000, preferred from about 32,000 to about 48,000. The butyl rubber, in particular as far as an un-crosslinked butyl rubber is concerned, is preferably provided at 23° C. in solid form. The DIN EN ISO 2555:2000-01 "plastic resins in liquid form, as emulsions or dispersions" serves to determine the apparent viscosity according to the Brookfield method for measuring of the viscosity of said at least one depolymerized butyl rubber as described above. The relation between said at least one un-crosslinked butyl rubber, even if it is a mixture, and said at least one depolymerized butyl rubber, even if it is a mixture, is preferably in a range from about 2.5:1 to about 1:2.5, further preferred in a range from about 2:1 to about 1:2, and even further preferred in a range from about 2.5:1 to about 1.3:1. In these ranges sufficiently good values for the peeling resistance and thus a good bonding of an anti-corrosion product according to the present disclosure are achieved in view of such kind of an anti-corrosion composition.

As far as in this anti-corrosion composition an at least partly pre-crosslinked butyl rubber is used, this is present in the anti-corrosion composition preferably in a quantity ranging from about 1% by weight to about 35% by weight, further preferred in a quantity ranging from about 2% by weight to about 25% by weight, even further preferred in a quantity ranging from about 2.5% by weight to about 15% by weight, each based on the total quantity of the anti-corrosion composition. Preferably, said crosslinked (pre-crosslinked) butyl rubber is in this case present in a mixture with an un-crosslinked butyl rubber, wherein the relation of said at least one un-crosslinked butyl rubber, even of mixtures of un-crosslinked butyl rubbers, to the relation of said at least partly pre-crosslinked butyl rubber, even of mixtures of it, is in a range from about 80:1 to about 1.5:1, preferred in a range from about 60:1 to about 3:1.

Alternatively to said at least one butyl rubber or in mixture with said at least one butyl rubber, the anti-corrosion composition can comprise at least one polyisobutylene having a Staudinger index $J_0$ ranging from about 230 $cm^3/g$ to about 900 $cm^3/g$, preferred ranging from about 400 $cm^3/g$ to about 800 $cm^3/g$, and an average relative molar mass $\overline{M}_V$ (viscosity agent) ranging from about 950,000 g/mole to about 5,500,000 g/mole, preferred with an average relative molar mass $\overline{M}_V$ ranging from about 1,500,000 g/mole to about 5,000,000 g/mole, even further preferred with an average relative molar mass $\overline{M}_V$ ranging from about 3,000,000 g/mole to about 4,500,000 g/mole. In this case, said at least one polyisobutylene can also have a Staudinger index $J_0$ ranging from about 230 $cm^3/g$ to about 900 $cm^3/g$, preferred ranging from about 400 $cm^3/g$ to about 800 $cm^3/g$, and an average relative molar mass $\overline{M}_V$ (viscosity agent) ranging from about 919,000 g/mole to about 7,493,000 g/mole, preferred ranging from about 2,152,000 g/mole to about 6,251,000 g/mole. Furthermore, in this case, the at least one polyisobutylene can also have a Staudinger index $J_0$ ranging from about 235 $cm^3/g$ to about 736 $cm^3/g$, preferred ranging from about 316 $cm^3/g$ to about 692 $cm^3/g$, further preferred ranging from about 496 $cm^3/g$ to about 646 $cm^3/g$, and an average relative molar mass $\overline{M}_V$ (viscosity agent) ranging from about 950,000 g/mole to about 5,500,000 g/mole, preferred ranging from about 1,500,000 g/mole to about 5,000,000 g/mole, further preferred ranging from about 3,000,000 g/mole to about 4,500,000 g/mole.

The Staudinger index $J_0$ was formerly also referred to as intrinsic viscosity. It is calculated from the flow time at 20° C. through a capillary of an Ubbelohde viscometer according to the following formula (Schulz-Blaschke equation):

$$J_0=\eta_{sp}/c(1+0.31^x\eta_{sp})cm^3/g$$

wherein $$\eta_{sp} = \frac{t}{t_o} - 1 \text{ (specific viscosity)},$$

wherein t indicates the flow time of the solution with a Hagenbach-Couette correction, to indicates the flow time of the solvent with a Hagenbach-Couette correction and c the concentration of the solution in $g/cm^3$. The average relative molar mass $\overline{M}_V$ is calculated from the following formula:

$$\sqrt[0.65]{\frac{J_o \times 10^2}{3.06}}$$

Such polyisobutylenes can be used together with said at least one, particularly at least partly pre-crosslinked, butyl rubber, in particular replace it in part. However, it may also be provided that instead of at least one, especially at least partly pre-crosslinked, butyl rubber, at least one polyisobutylene as above defined and in the quantities corresponding to those of said at least one butyl rubber is used in the anti-corrosion composition according to the disclosure. Said at least one polyisobutylene is preferably present in the composition in a quantity ranging from about 1% by weight to about 20% by weight, further preferred in a quantity ranging from about 2% by weight to about 10% by weight, each based on the total quantity of the anti-corrosion composition, if it is used in a mixture with at least one butyl rubber. It may also be provided to use mixtures of various polyisobutylenes with the above indicated properties.

Alternatively to said at least one butyl rubber or in mixture with said at least one butyl rubber, the anti-corrosion composition can comprise at least one first polyisobutylene having a Staudinger index $J_0$ ranging from about 15 $cm^3/g$ to about 98 $cm^3/g$, and an average relative molar mass $\overline{M}_V$ ranging from about 32,000 g/mole to about 280,000 g/mole and/or at least one second polyisobutylene having a Staudinger index $J_0$ ranging from about 105 $cm^3/g$ to about 238 $cm^3/g$, and an average relative molar mass $\overline{M}_V$ ranging from about 350,000 g/mole to about 900,000 g/mole. In this case, said at least one first polyisobutylene can also have a Staudinger index $J_0$ ranging from about 15 $cm^3/g$ to about 98 $cm^3/g$, and an average relative molar mass $\overline{M}_V$ ranging from about 14,000 g/mole to about 247,000 g/mole, and/or said at least one second polyisobutylene can also have a Staudinger index $J_0$ ranging from about 105 $cm^3/g$ to about 238 $cm^3/g$, and an average relative molar mass $\overline{M}_V$ ranging from about 275,000 g/mole to about 968,000 g/mole. Furthermore, in this case, said at least one first polyisobutylene can have a Staudinger index $J_0$ ranging from about 26 $cm^3/g$ to about 106 $cm^3/g$, and an average relative molar mass $\overline{M}_V$ ranging from about 32,000 g/mole to about 280,000 g/mole, and/or said at least one second polyisobutylene can have a Staudinger index $J_0$ ranging from about 123 $cm^3/g$ to about 227 $cm^3/g$, and an average relative molar mass $\overline{M}_V$ ranging from about 350,000 g/mole to about 900,000 g/mole.

Polyisobutylenes in the sense of the present disclosure are preferably synthesized via a cationic polymerization of isobutene (2-methylpropene) in a temperature range between about −100° C. and about 0° C. During this synthesizing, the temperature influences the molar mass of the polyisobutene produced in such way, the lower the temperature, the higher is its molar mass. Usually, boron trifluoride or aluminum trichloride are used in aqueous or alcoholic solution as initiators.

Said at least one first polyisobutylene preferably has a Staudinger-Index $J_0$ ranging from about 22 cm3/g to about 65 cm3/g, and even further preferred a Staudinger-Index $J_0$ ranging from about 25 cm3/g to about 45 cm3/g. Preferred, said at least one first polyisobutylene has an average relative molar mass $\overline{M}_V$ (viscosity agent) ranging from about 35.000 g/mole to about 95.000 g/mole and further preferred an average relative molar mass $\overline{M}_V$ ranging from about 37.000 g/mole to about 70.000 g/mole. Said at least one first polyisobutylene can advantageously also have a Staudinger index $J_0$ ranging from about 22 $cm^3/g$ to about 65 $cm^3/g$, and an average relative molar mass $\overline{M}_V$ (viscosity agent) ranging from about 25,000 g/mole to about 131,000 g/mole, further preferred a Staudinger index $J_0$ ranging from about 25 $cm^3/g$ to about 45 $cm^3/g$, and an average relative molar mass $\overline{M}_V$ ranging from about 30,000 g/mole to about 75,000 g/mole. Said at least one first polyisobutylene can furthermore advantageously have a Staudinger index $J_0$ ranging from about 28 $cm^3/g$ to about 53 $cm^3/g$, and an average relative molar mass $\overline{M}_V$ (viscosity agent) ranging from about 35,000 g/mole to about 95,000 g/mole, further preferred a Staudinger index $J_0$ ranging from about 29 $cm^3/g$ to about 43 $cm^3/g$, and an average relative molar mass $\overline{M}_V$ ranging from about 37,000 g/mole to about 70,000 g/mole.

Said at least one first polyisobutylene is preferably comprised by the anti-corrosion composition in a quantity ranging from about 28% by weight to about 60% by weight, further preferred in a quantity ranging from about 33% by weight to about 50% by weight, each based on the total quantity of the composition.

Said at least one second polyisobutylene preferably has a Staudinger-Index $J_0$ ranging from about 106 $cm^3/g$ to about 160 $cm^3/g$. Preferred, said at least one second polyisobutylene has an average relative molar mass $\overline{M}_V$ ranging from about 300.000 g/mole to about 600.000 g/mole. Preferred, said at least one second polyisobutylene has a Staudinger index $J_0$ ranging from about 106 $cm^3/g$ to about 160 $cm^3/g$, and an average relative molar mass $\overline{M}_V$ ranging from about 279,000 g/mole to about 526,000 g/mole. Furthermore, said at least one second polyisobutylene preferably also has a Staudinger index $J_0$ ranging from about 111 $cm^3/g$ to about 174 $cm^3/g$, and an average relative molar mass $\overline{M}_V$ ranging from about 300,000 g/mole to about 600,000 g/mole.

Preferably, the at least one second polyisobutylene is comprised by the anti-corrosion composition in a quantity ranging from about 10% by weight to about 35% by weight, further preferred in a quantity ranging from about 13% by weight to about 28% by weight, each based on the total quantity of the anti-corrosion composition.

The relation of said at least one polyisobutylene, i.e. the total quantity of the used first polyisobutylene, even if it is a mixture, to said at least second polyisobutylene, i.e. the total quantity of the second polyisobutylene, even if it is a mixture, is preferably in a range from about 2.5:1 to about 1:2.5, further preferred in a range from about 2.2:1 to about 1.2:1.

Besides said at least one butyl rubber, preferably at least one un-crosslinked butyl rubber, especially preferred at least one un-crosslinked butyl rubber and/or polyisobutylene in a quantity ranging from about 20% by weight to about 70% by weight, further preferred in a quantity ranging from about 30% by weight to about 67% by weight, based on the total quantity of the anti-corrosion composition, the anti-corrosion composition can comprise further additives. Said additives are selected from a group comprising crosslinking agents, plasticizers, filler materials, antioxidants, tackifiers, polymer adhesion promoting and/or pigments, including color pigments and carbon black. As plasticizers, a process oil is preferably used, wherein the use of a process oil can be waived or its quantity reduced, if at least one depolymerized butyl rubber as described above, is present in the anti-corrosion composition. The plasticizer is preferably comprised by the anti-corrosion composition in a quantity ranging from about 0.5% by weight to about 10% by weight, further preferred in a quantity ranging from about 2% by weight to about 8% by weight, each based on the total quantity of the composition.

Said at least one filler material is comprised by the composition in a quantity in a range of about 10% by weight, preferred from about 20% by weight to about 70% by weight, further preferred in a quantity ranging from about 20% by weight to about 56% by weight, and even further preferred in a quantity ranging from about 25% by weight to about 55% by weight, each based on the total quantity of the anti-corrosion composition. Especially preferred, said at least one filler material is formed powdery or fibrous. Especially preferred, the anti-corrosion composition comprises at least one first powdery filler material and at least one second fibrous filler material. Especially preferred in case of such combined adding of at least one powdery and at least one fibrous filler material, said fibrous filler material is added at a lower quantity to the anti-corrosion composition, compared to the powdery filler material, preferably in a quantity ranging from about 0.1% by weight to about 1% by weight, based on the total quantity of the anti-corrosion composition. Preferably, the at least one filler material is selected from a group of the powdery mineral filler materials or of the mineral and/or organic fibrous filler materials as for example talcum, zinc oxide, wollastonite with a needle structure, cellulose fibers, or the like. It may be selected from a group of organic fibers as for example from acrylonitrile fibers with a length ranging from about 1.5 mm to about 20 mm, further preferred with a length from about 4 mm to about 15 mm, preferably with a fineness ranging from about 0.5 dtex to about 100 dtex, further preferred with a fineness ranging from about 1 dtex to about 20 dtex, each measured according to ISO 1144 in the version of 1973. As far as a powdery filler material, in particular a mineral powdery filler material is used, it preferably has a residue in % at a sieve analysis according to DIN 66165 in the version 1987-04 at H-100 (100 μm) from about 1% to about 5%, at H-60 (60 μm) from about 1% to about 5% and at H-30 (30 rpm) ranging from about 1% to about 5%.

As far as at least one antioxidant is provided, this can be comprised by the anti-corrosion composition, preferably as a mixture of various antioxidants, in a quantity ranging from about 0.1% by weight to about 1% by weight, further preferred in a quantity ranging from about 0.2 to about 0.5% by weight, each based on the total quantity of it. As far as at least one stabilizer, which may also be referred to as a dispersing agent, is contained in the anti-corrosion composition, this is preferably selected from a group comprising $C_{10-}$ to $C_{24-}$ carbonic acids, and is preferably a stearic acid. Said at least one stabilizer/dispersing agent is comprised by the anti-corrosion composition preferably in a quantity ranging from about 0.05% by weight to about 0.5% by weight, based on the total quantity of the composition. Herein, also metal salts of the mentioned carbonic acids as for example zinc stearates, may also be used. A flame retardant can also be used, preferably in a quantity ranging from about 0.02% by weight to about 2% by weight, based on the total quantity of the anti-corrosion composition according to the disclosure.

The anti-corrosion composition can furthermore comprise at least one tackifier, in particular a hydrocarbon resin, in a quantity ranging from about 5% by weight to about 25% by weight, further preferred in a quantity ranging from about 8% by weight to about 20% by weight, each based on the total quantity of the anti-corrosion composition.

The anti-corrosion composition preferably comprises at least one cross-linking agent, preferably selected from a group comprising at least one phenol resin. Especially preferred, said at least one phenol resin is prepared from at least one phenol or its derivatives and at least one aldehyde, selected from a group comprising formaldehyde, acetaldehyde, benzaldehyde and/or acrolein, wherein the formaldehyde is especially preferred. As phenol derivatives particularly tetra-butylphenol, nonylphenol or octylphenol are used, but also aryl derivatives, especially phenylphenol, as well as divalent phenols as for example resorcinol or bisphenol A and naphthol can be used. Especially preferred are octylphenol-formaldehyde resins. Said phenol resins according to the disclosure are in particular such being in the class of the so-called resoles, i.e. which are prepared via a base-catalyzed reaction of the mentioned starting products. Preferably, the anti-corrosion composition comprises said at least one crosslinking agent in a quantity ranging from about 0.2% by weight to about 10% by weight, further preferred in a quantity ranging from about 1% by weight, further preferred from about 3.5% by weight to about 8% by weight, preferred to about 4% by weight, based on the total quantity of the anti-corrosion composition.

The anti-corrosion composition preferably comprises at least one polymeric adhesion promoter in a quantity ranging from about 0.05% by weight to about 0.5% by weight, preferably ranging from about 0.04% by weight to about 0.5% by weight, based on the total quantity of the anti-corrosion composition. Especially preferred in this case, said at least one polymeric adhesive promoter is selected from the group of polyethylenes and/or polypropylenes. If a carrier film made of polyethylene is provided, said at least one polymeric adhesive promoter is preferably selected from a group comprising at least one polyethylene, the same applies to polypropylene. Said at least one polymeric adhesive promoter can preferably be used as a master batch, to which color pigments can preferably be added. Based on said at least one polymeric adhesive promoter, the color pigments can in this case be comprised in a quantity from about 0.5% by weight to about 6% by weight, based on the total quantity of the used polymeric adhesive promoter, while the remainder is prepared from the polyethylene and/or polypropylene.

As far as in the present disclosure the term "about" is used for values, value ranges or terms containing values, those values are to be understood which are regarded as professionally usual in this context by a person skilled in the art. In particular comprised by the term "about" are deviations of the mentioned values, value ranges or terms containing values of +−10%, preferred +−5%, further preferred +−2%.

An anti-corrosion composition according to the disclosure can be formed in a way that it has two outer layers comprising the anti-corrosion composition, which encompass an inner layer formed of a carrier foil or of an anti-jackknife brake, as above described, with an adhesion promoting layer made of the anti-corrosion composition according to the disclosure, arranged on one or both sides of it. If the anti-corrosion product according to the disclosure is formed in a way that it comprises two outer anti-corrosion layers made of an anti-corrosion composition, and a carrier film or anti-jackknife brake arranged more or less in the middle between these layers, having an adhesion promoting layer made of the adhesion promoting composition according to the disclosure arranged on one or both sides of it, the anti-corrosion tape according to the disclosure is formed symmetrically. It can also be formed asymmetrically. It may for example be provided that the product comprises only one single layer of the anti-corrosion composition being an anti-corrosion layer, which is arranged on a carrier film, having on one or both sides an adhesion promoting layer made of the adhesion promoting composition according to the disclosure. If two adhesion promoting layers made of the adhesion promoting composition according to the disclosure are provided, there is for example an outer layer, which may have another composition than the adhesion promoting layer on the other side of the carrier film, facing the anti-corrosion layer. Particularly, as outlined further above, in an adhesion promoting composition made of the adhesion promoting composition according to the disclosure, disposed on the outside, additives can also be provided, in particular catalyzing agents and/or co-reagents, if appropriate, which render a catalyzing agent compatible. As a catalyzing agent, for example zinc chloride or zinc stearate can be used, which can accelerate crosslinking in an anti-corrosion composition of the anti-corrosion layer, especially at higher temperatures. Upon wrapping or applying the anti-corrosion product on tubular or other articles with an overlapping, and providing at least one catalyzing agent in the outer adhesion promoting layer, a crosslinking can be initiated in the overlapping region, preferably at higher temperatures, especially in case of providing at least one crosslinking agent in the anti-corrosion composition, by which a stronger bonding can be achieved, particularly without fold formation, in the overlapping region between the outer adhesion promoting layer and the anti-corrosion composition arranged on the opposite side, and even in general.

An asymmetric formation of the anti-corrosion tape according to the disclosure can also be achieved, if on each of the two sides of a carrier film or anti-jackknife brake an anti-corrosion layer made of an anti-corrosion composition, is applied, which must not necessarily be identical, wherein the thickness of the anti-corrosion layers is different. In this case, the carrier film or anti-jackknife brake as a carrier has an adhesion promoting layer made of the adhesion promoting composition according to the disclosure on at least one side, preferably on both sides of it.

As already described further above, the carrier, especially in the form of a carrier film or anti-jackknife brake having an adhesion promoting layer arranged on one side of it, preferably on both sides of it, which is made of the adhesion promoting composition according to the disclosure, is subject to a stretching, after being produced, preferably in a co-extrusion or lamination process, further preferred in a co-extrusion process. Subsequently, such a two- or three-layered coating compound is coated with the anti-corrosion composition in order to form an anti-corrosion layer on at least one side. The anti-corrosion layer advantageously has a thickness in a range from about 0.25 mm to about 2 mm, further preferred a thickness in a range from about 0.35 mm to about 1.3 mm.

In addition to the above described anti-corrosion product according to the disclosure, a further product, in particular a tape can be provided, in order to provide a supplemental mechanical protection. Said further product is formed at least single-layered and it is preferably formed single-, two- or three-layered. It may however even be formed four-layered or otherwise higher-layered. Said further product is to be referred to as mechanical protection product. Said further product preferably comprises one layer made of at least one polyethylene and/or polypropylene, preferred of at least one polyethylene, preferred of electron-beam cross-linked polyethylene or polypropylene, of sufficient strength. As far as polyethylene is used, this has preferably an elongation at brake according to EN ISO 527 in the version 2005-06 of ≥300%, further preferred of ≥400%, even further preferred of ≥500%, preferably of a such ranging from about 300% to about 800%. Further preferred, an appropriate polyethylene has a tensile stress according to EN ISO 527 in the version 2012-06 ranging from about 8 MPa to about 25 MPa, further preferred ranging from about 12 MPa to about 20 MPa.

Said at least one layer made of polyethylene and/or polypropylene, preferably exactly one layer, of said mechanical protection product can on one side be provided with an adhesive layer, however, it may also be provided that it is on one side provided with an anti-corrosion layer made of an anti-corrosion composition, as outlined further above.

Moreover, in addition to the anti-corrosion product and/or the mechanical protection product, a pipe protection pad may be provided, which is arranged around the at least one anti-corrosion product, if appropriate even in combination with said mechanical protection product, which has an advantageous, in particular load-distributing effect on the wrapping made of the at least one anti-corrosion product, disposed under the pipe protection pad. Tubular articles may for example also be provided, onto which for example even two or more anti-corrosion products according to the disclosure are applied.

Each possible product which is susceptible to corrosion, can be protected by the anti-corrosion product according to the disclosure. Especially preferred, the anti-corrosion product according to the disclosure is used for pipes and systems comprising pipes. In particular, the anti-corrosion product is used for wrapping pipelines or gas pipes of each kind. It can also be used for other technical plants and/or areas, where corrosion can occur, and not only in the form of a wrapping, but also in the form of a pad or cover.

The present disclosure also relates to the use of the adhesion promoting composition as described further above in anti-corrosion compositions according to the disclosure, and in such in the form of at least one adhesion promoting layer. Especially preferred according to the disclosure is a use, in which the anti-corrosion product comprises a carrier made of a carrier material selected from a group comprising polyethylene and/or polypropylene, preferably such as described further above, and at least one anti-corrosion layer made of an anti-corrosion composition as described further above, in particular such comprising at least one butyl rubber and/or at least one polyisobutylene, wherein further preferred, between said anti-corrosion layer and said carrier, preferably in the form of a carrier film or anti-jackknife brake, at least one adhesion promoting layer made of the adhesion promoting composition according to the disclosure is arranged, wherein the latter can also be arranged on both sides of a carrier, in particular in the form of a carrier film or an anti-jackknife brake. Especially preferred is the use of an anti-corrosion product in the form of a pad, further preferred having a construction as described above.

Furthermore, the present disclosure relates to a method for obtaining a corrosion protection on pipes and systems comprising pipes as well as on other plants and installation by using an anti-corrosion product according to the disclosure as described further above. This is herein used in the above-outlined manner. Especially preferred, according to the method according to the disclosure, pipes and systems comprising pipes are wrapped with an anti-corrosion product in tape form. Primers and pre-coating agents can also be used.

Furthermore, the present disclosure relates to a method for producing a carrier, particularly in the form of a carrier film or an anti-jackknife brake, as outlined above, wherein the carrier material and the adhesion promoting composition are co-extruded. Preferably, according to the method according to the disclosure, after co-extrusion, an electron-beam crosslinking of the received product is initiated, wherein the product can be formed at least two-layered or three layered upon applying an adhesion promoting layer made of the adhesion promoting composition according to the disclosure on both sides of the carrier, preferably in the form of a carrier film or an anti-jackknife brake. Alternatively, after co-extrusion according to the method of to the disclosure, advantageously, a crosslinking or bonding by means of a heat treatment of the received product is carried out.

Preferably, before co-extrusion, a mixture of the components of the adhesion promoting composition according to the disclosure is produced. This mixture is homogenized preferably at a temperature in a range from about 150° C. to about 200° C., preferred in a range from about 160° C. to about 180° C. After homogenization, said mixture is preferably cooled down to a temperature in a range from about 10° C. to about 80° C., further preferred to a temperature in a range from about 20° C. to about 60° C., wherein the cooling is preferably carried out on a rolling mill. Subsequently, preferably, a granulation is carried out. Subsequently, the co-extrusion can be performed. For this purpose, single-screw extruders or twin-screw extruders can be used. Said co-extrusion is preferably conducted at a temperature in a range from about 170° C. to about 240° C. further preferred at a temperature in a range from about 200° C. to about 220° C. After co-extrusion, the received co-extruded intermediate product, which has the carrier in the form of a carrier film or an anti-jackknife brake including an adhesion promoting layer made of the adhesion promoting composition according to disclosure on one or two sides of it, is cooled down. Subsequently, an electron-beam crosslinking is performed for example with β-rays at a dose of 100 kGy. Preferably, a crosslinking is conducted via electron rays with β-rays at a dose ranging from about 25 kGy to about 250 kGy. Subsequently, but also before electron-beam crosslinking, the two- or three-layered compound of a carrier with one or two adhesion promoting layers on both sides of it can be subject to stretching. Alternatively, a crosslinking or bonding is preferably carried out by means of heat treatment at a temperature at which the viscosity of the components of the adhesion promoting composition, in particular of the said at least one butyl rubber and of said at least one elastomer, is reduced, preferred at about 150° C. to about 200° C., further preferred at about 160° C. to about 180° C.

The present disclosure is explained in more detail based on the following examples. Here, it should be mentioned in advance that the features indicated in the examples may be combined with each single or with each other of all features described in the general description. In particular, the composition of the anti-corrosion composition as described is just an example.

A first adhesion promoting composition according to the disclosure is composed of 50% by weight of at least one partly pre-crosslinked butyl rubber having the properties indicated in the general description, 33.33% by weight of an electron-beam cross-linkable polyethylene and 16.67% by weight of an ethylene-propylene-diene rubber with 5-ethylidene-2-norbornes as a diene.

A second adhesion promoting composition according to the disclosure is composed of 50% by weight of an electron-beam cross-linkable polyethylene of medium density, 25% by weight of an un-crosslinked butyl rubber having the properties as indicated in the general description, and 25% by weight of an ethylene-propylene-diene rubber with 5-ethylidene-2-norbornes as a diene.

The two afore-mentioned adhesion promoting compositions were processed to an intermediate product in the form of a carrier with adhesion promoting layers arranged on both sides of it, by co-extrusion with a carrier film made of an electron-beam cross-linkable polyethylene, which was identical to the polyethylene being comprised by the two adhesion promoting compositions. The carrier film of the intermediate product had in this case a thickness of 0.5 mm, the two adhesion promoting layers had a thickness of 40 μm. Subsequently, an anti-corrosion layer made of an anti-corrosion composition was applied on one side of this intermediate product composed of a carrier in the form of a carrier film with two adhesion promoting layers, the anti-corrosion composition comprising 28.5% by weight of an un-crosslinked butyl rubber, identical to the 28.5% by weight of a depolymerized butyl rubber used in the adhesion promoting layers as outlined in the general description, 44.5% by weight of a powdery mineral filler material in the form of a talcum, and other additives such as antioxidants and stabilizers. The anti-corrosion layer had a thickness of 1.0 mm.

For comparison, an identical anti-corrosion layer was applied onto an identical carrier film, while in this example, the adhesion promoting layer comprised 50% by weight of an electron-beam cross-linkable polyethylene and 50% by weight of an un-crosslinked butyl rubber, both of them corresponding to those materials mentioned in the two above-described examples according to the disclosure. The thicknesses of the layers were also identical. In this example, said carrier in the form of a carrier film with the two adhesion promoting layers was in one case subject to electron-beam crosslinking and in another case not. The electron-beam crosslinking is performed with β-rays at a dose of 100 kGy. Subsequently, the anti-corrosion composition was applied in the form of an anti-corrosion layer.

Subsequently, peeling resistances according to DIN EN 12068 in the version 1993-03 were measured, while a steel pipe was wrapped with one layer of the respective anti-corrosion tapes, not overlapping. The measurement was made at a room temperature of 23° C. and at 100° C. The result of this measurement for the peeling resistance of the anti-corrosion tape at 23° C. was a value of 20 N/cm, at 100° C. of 1.5 N/cm, while for the comparative tape without said ethylene-propylene-diene rubber at room temperature, a peeling resistance of 7 N/cm and at 100° C. of 0.4 N/cm was measured. The measurements were made with the electron-beam crosslinked anti-corrosion tapes.

Moreover, in addition, a rheological analysis was made, namely a determination of the storage module according to DIN 54458:2013-03. Said storage module was in this case measured with the electron-beam crosslinked as well as with the not-electron-beam crosslinked anti-corrosion tapes. In case of the comparative anti-corrosion tape without electron-beam crosslinking, the storage module was at 100° C. 3 MPa, after electron-beam crosslinking at 1.1 MPa, whereas the anti-corrosion tape according to the disclosure with 50% by weight of an electron-beam cross-linkable polyethylene, 25% by weight of an un-crosslinked butyl rubber and 25% by weight of an EPDM, as described above, had a storage module at 100° C. of 5 MPa in the not-electron-beam crosslinked version and of 4.1 MPa in the electron-beam crosslinked version.

If in the anti-corrosion tapes according to the disclosure the un-crosslinked butyl rubber was exchanged by a pre-crosslinked butyl rubber having the properties as described in the general description, the peeling resistance was 42.1 N/cm at 23° C. compared to 20.0 N/cm and it was at 1.6 N/cm at 100° C. compared to 1.5 N/cm, the comparison being made with the anti-corrosion tape according to the disclosure comprising an un-crosslinked butyl rubber.

A third adhesion promoting composition according to the disclosure is composed of 33.3% by weight (% by weight or weight-%) of a not electron-beam cross-linkable LDPE (polyethylene of low density), 33.4% by weight of a partly crosslinked butyl rubber having the properties indicated in the general description, and 33.3% by weight of an EPDM (ethylene-propylene-diene-rubber) having 5-ethylidene-2-norbornes as a diene.

A fourth adhesion promoting composition according to the disclosure is composed of 33.3% by weight of a not electron-beam cross-linkable LDPE, 50% by weight of a partly crosslinked butyl rubber having the properties indicated in the general description, and 16.7% by weight of an EPDM having 5-ethylidene-2-norbornes as a diene.

A fifth adhesion promoting composition according to the disclosure is composed of 67.7% by weight of a partly crosslinked butyl rubber having the properties indicated in the general description, and 33.3% by weight of a not electron-beam cross-linkable polypropylene (PP).

A sixth adhesion promoting composition according to the disclosure is composed of 67.7% by weight of an uncrosslinked butyl rubber having the properties indicated in the general description, and 33.3% by weight of a not electron-beam cross-linkable polypropylene.

A seventh adhesion promoting composition according to the disclosure is composed of 33.4% by weight of partly crosslinked butyl rubber having the properties indicated in the general description, 33.3% by weight of an EPDM having 5-ethylidene-2-norbornes as a diene and 33.3% by weight of a not electron-beam cross-linkable polypropylene.

An eighth adhesion promoting composition according to the disclosure is composed of 33.4% by weight of an uncrosslinked butyl rubber having the properties indicated in the general description, 33.3% by weight of an EPDM having 5-ethylidene-2-norbornes as a diene and 33.3% by weight of a not electron-beam cross-linkable polypropylene.

A ninth adhesion promoting composition according to the disclosure is composed of 56.32% by weight of a standard butyl rubber, 32.00% by weight of a not electron-beam cross-linkable polypropylene, 10.24% by weight of a hydrocarbon resin, 0.15% by weight of an antioxidant and 1.28% by weight of a black pigment.

The present disclosure suggests an adhesion promoting composition, an intermediate product having adhesion promoting layers made of the adhesion promoting composition according to the disclosure, as well as an anti-corrosion product and a method and use thereof, which advantageously provides mechanically solid and temperature-resistant anti-corrosion products, preferably in tape format, comprising in particular at least one butyl rubber and/or at least one polyisobutylene.

The invention claimed is:

1. Adhesion promoting composition for an anti-corrosion product, comprising about 20% by weight to about 70% by weight of at least one polyolefin selected from the group consisting of: polyethylene and polypropylene;

about 20% by weight to about 65% by weight of at least one butyl rubber; and about 6% by weight to about 35% by weight of at least one elastomer selected from the group consisting of: ethylene-propylene-rubber and ethylene-propylene-diene rubber;

each based on the total quantity of the adhesion promoting composition.

2. Adhesion promoting composition according to claim 1, wherein the at least one polyolefin is electron-beam cross-linkable.

3. Adhesion promoting composition according to claim 1 wherein the at least one butyl rubber is selected from the group consisting of: at least partly cross-linked and un-crosslinked butyl rubbers.

4. Adhesion promoting composition according to claim 3, wherein the at least partly cross-linked butyl rubber has a Mooney viscosity ML (1+3) at 127° C. in a range of about 50 MU to about 98 MU.

5. Adhesion promoting composition according to claim 3, wherein the un-crosslinked butyl rubber has an average molecular weight $M_w$ in a range of about 150,000 to about 2,000,000 and a Mooney viscosity ML (1+8) at 125° C. in a range of about 20 MU to about 65 MU.

6. Adhesion promoting composition according to claim 1 wherein at least one elastomer is an ethylene-propylene-diene-rubber.

7. Adhesion promoting composition according to claim 6 wherein the ethylene-propylene-diene-rubber comprises a 5-ethylidene-2-norbone in a quantity ranging from about 0.8% by weight to about 8% by weight, based on the total quantity of the monomers, being used in a polymerization to the ethylene-propylene-diene rubber.

8. Adhesion promoting composition according to claim 1 comprising_at least one additive, selected from the group consisting of: tackifiers, antioxidants, catalysts, co-reagents and pigments.

9. A carrier with an adhesion promoting composition according to claim 1 applied on at least one side of the carrier.

10. Carrier according to claim 9, wherein a carrier material is selected from the group consisting of: polyethylene and polypropylene.

11. Carrier according to claim 10 wherein the carrier material is electron-beam cross-linkable.

12. Carrier according to claim 9 wherein the carrier is formed in co-extrusion together with the adhesion promoting composition.

13. Anti-corrosion product comprising a carrier with at least one adhesion promoting composition according to claim 9 with at least one anti-corrosion layer applied on the adhesion promoting composition.

14. A method for the protection of products from corrosion including the steps of providing a structure to be protected and applying an anti-corrosion product according to claim 13.

15. Method according to claim 14, wherein the structure is wrapped with the anti-corrosion product.

16. Method for producing a carrier according to claim 9 comprising the step of coextruding the carrier material and the adhesion promoting composition.

17. Method according to claim 16, including the step of electron-beam cross-linking the coextruded carrier material and adhesion promoting composition.

* * * * *